United States Patent

Hatano

[11] Patent Number: 5,909,255
[45] Date of Patent: *Jun. 1, 1999

[54] Y/C SEPARATION APPARATUS

[75] Inventor: Takahisa Hatano, Sapporo, Japan

[73] Assignee: Matsushita Electric Industrial Co., Ltd., Osaka, Japan

[*] Notice: This patent is subject to a terminal disclaimer.

[21] Appl. No.: 08/801,191

[22] Filed: Feb. 18, 1997

[30] Foreign Application Priority Data

Feb. 19, 1996 [JP] Japan ................................... 8-030305

[51] Int. Cl.⁶ ................................................... H04N 9/78
[52] U.S. Cl. ............................................. 348/663; 348/631
[58] Field of Search ................................. 348/663, 664, 348/665–670, 609, 610; H04N 9/28, 9/64

[56] References Cited

U.S. PATENT DOCUMENTS

| | | | |
|---|---|---|---|
| 4,050,084 | 9/1977 | Rossi | 348/668 |
| 5,047,840 | 9/1991 | Miki | 348/664 |
| 5,051,818 | 9/1991 | Mishima | 348/668 |
| 5,146,317 | 9/1992 | Ishizu et al. | 348/663 |
| 5,264,923 | 11/1993 | Bhang . | |
| 5,345,276 | 9/1994 | Hong | 348/663 |
| 5,432,563 | 7/1995 | Kasahara | 348/625 |
| 5,500,687 | 3/1996 | Hatano et al. | 348/665 |
| 5,583,579 | 12/1996 | Shim | 348/663 |
| 5,627,600 | 5/1997 | Hatano et al. | 348/668 |
| 5,654,770 | 8/1997 | Hatano et al. | 348/668 |
| 5,786,872 | 7/1998 | Miyazaki et al. | 348/669 |

FOREIGN PATENT DOCUMENTS

| | | | |
|---|---|---|---|
| 0590831 A2 | 6/1994 | European Pat. Off. | H04N 9/78 |
| 7-298291 | 11/1995 | Japan . | |
| 2 283 145 | 4/1995 | United Kingdom . | |
| 2 288 704 | 10/1995 | United Kingdom . | |

*Primary Examiner*—Andrew I. Faile
*Assistant Examiner*—Reuben M. Brown
*Attorney, Agent, or Firm*—Ratner & Prestia

[57] ABSTRACT

A Y/C separation apparatus separating a luminance signal and a chrominance signal from a composite color television signal includes a high band level detection circuits for detecting a high band level of each input signal and a judge circuit for controlling Y/C separation and selects one of filters to pass the input signal according to the high band levels detected by the high band level detection circuits and controls a separated chrominance signal component. As a result, when the high band level is small, a horizontal BPF is selected and even when the input signal is a black or white video signal without chrominance signal, dot interference is not conspicuous.

8 Claims, 6 Drawing Sheets

Y/C SEPARATION APPARATUS

BACKGROUND OF THE INVENTION

The present invention relates to a Y/C (luminance/chrominance) separation apparatus for separating a luminance signal and a chrominance signal from a composite color television signal.

According to recent digital processing techniques, a Y/C separation apparatus for separating a luminance signal and a chrominance signal from a composite color television signal is used.

For example, an adaptive type Y/C separation apparatus selecting a plurality of filters according to correlation between a reference signal and a signal near the reference signal in the horizontal or vertical direction as described in Japanese Patent Laid-Open 7-298291.

A Y/C separation apparatus in accordance with the prior art is explained below, referring to the drawing.

FIG. 6 is an example of a block diagram of Y/C separation apparatus in accordance with the prior art.

In FIG. 6, the blocks 601 and 602 are a first delay device and a second delay device delaying each input signal (composite signal) by one horizontal scanning period (lH, hereafter), respectively. The block 603 is a first chrominance signal bandpass filter (first BPF, hereafter) for extracting a chrominance signal from the output of delay device 601. The block 604 is a first comb filter for extracting a chrominance signal from the input signal and the output of delay device 601. The block 605 is a second comb filter for extracting a chrominance signal from the output signals of delay devices 601 and 602. The block 606 is a first correlation detection circuit for detecting a correlation between the input signal and the output signal of delay device 601. The block 607 is a second correlation detection circuit for detecting a correlation between the output signals of delay devices 601 and 602. The block 608 is a mixer for mixing the outputs of the filters 603, 604 and 605 according to the correlation results of correlation detection circuits 606 and 607. The block 609 is a second chrominance signal bandpass filter (second BPF, hereafter) for limiting a bandwidth of the output of mixer 608. The block 610 is a subtracter for outputting a luminance signal by subtracting a chrominance signal which is an output of second BPF 609 from the input signal delayed by 1H.

In the prior art described here, the signal is processed taking an input signal delayed by 1H as a center. Here, let us call the input signal delayed by 1H a reference signal.

The function of the Y/C separation apparatus composed like the above is explained below. The inputted composite signal is delayed at delay devices 601 and 602. The output of delay device 601 is defined as a reference signal. Comb filters 604 and 605 are composed by making differences between the reference signal and the signals apart from the reference signal by 1H, ahead and behind. The comb filters separate chrominance signal components by subtracting the signals apart from the reference signal by 1H from the reference signal.

A chrominance signal component of the reference signal is extracted by making the reference signal pass through first BPF 603. Correlation detection circuits 606 and 607 detect correlations (called vertical correlation) between the reference signal and the signals apart from the reference signal by 1H, ahead and behind (geometrically locates up and down the reference signal position)

Correlation is detected, for example, by filtering the absolute value of the difference between chrominance signal components of two signals and comparing the filtered output with a designated value. Mixer 608 selects a chrominance signal from the outputs of comb filters 604 and 605 and first BPF 603 according to the outputs of correlation detection circuits 606 and 607. That is, mixer 608 selects an output of comb filter 604 when a correlation between the reference signal and the signal ahead by 1H (one horizontal scanning period) exists, selects an output of comb filter 605 when a correlation between the reference signal and the signal behind by 1H exists and selects an output of first BPF 603 when neither correlation ahead nor behind exists. Thus, a signal passed an optimum filter is outputted according to the correlation between the reference signal and the signals ahead and behind by 1H.

Further, a chrominance signal can be outputted from second BPF 609 having a bandwidth for a chrominance signal by filtering the output of mixer 608. A luminance signal can be outputted from subtracter 610 by subtracting the above-described chrominance signal from the signal time compensated by delaying from the input signal by 1H.

However, according to the above composition, in the case in which a comb filter is adapted by misdetecting at correlation detection, for example, when the reference signal is only a luminance signal without chrominance component, a dot interference occurs and it is conspicuous.

SUMMARY OF THE INVENTION

A Y/C separation apparatus for separating a composite color television signal into a luminance signal and a chrominance signal of the present invention includes high band level detection means for detecting a high band level of the input signal and judging means for controlling Y/C separation and controlling a chrominance signal component separated by selecting a filter which makes the input signal pass according to the high band level detected at high band level detection means. Thus, the Y/C separation apparatus of the present invention has an effect that there is no conspicuous dot interference even when the input signal is only a luminance signal without chrominance component.

As a concrete example of the composition, it includes a first delay device for delaying by 1H a composite color television signal inputted, a second delay device for delaying by 1H the output of the first delay device, a first comb filter for extracting a chrominance signal from the input signal and the output of the first delay device, a second comb filter for extracting a chrominance signal from the the outputs of the first and second delay devices, a first bandpass filter for extracting a chrominance signal from the the outputs of the first delay device, a first correlation detection circuit for obtaining a correlation between the input signal and the output of the first delay device, a second correlation detection circuit for obtaining a correlation between the the outputs of the first and second delay devices, a correlation judge circuit for obtaining a mixing ratio of the comb filters from the outputs of the first and second correlation detection circuits, and a first mixer for mixing the outputs of the first and second comb filters according to the output of the correlation judge circuit and this composition is the same as that of the prior art.

A Y/C separation apparatus in accordance with the present invention, in addition to the above composition, further includes a first high band level detection circuit for extracting a subcarrier frequency component of the input signal, a second high band level detection circuit for extracting a subcarrier frequency component of the output of the first delay device, a third high band level detection circuit for extracting a subcarrier frequency component of the output of the second delay device, a BPF adaptation judge circuit for obtaining a mixing ratio of the output of the first mixer to the output of the first BPF according to the outputs of the first, the second and the third high band level detection circuits, a second mixer for mixing the outputs of the first mixer and the first BPF according to the output of the BPF adaptation judge circuit, and a second BPF for limiting the bandwidth of the output of the second mixer.

According to the above composition, a Y/C separation apparatus can be realized which has a feature that a chrominance signal controlled according to the condition of the high band level of the input signal is obtained from the output of the second mixer and further has a feature that no dot interference is conspicuous even when the correlation detection circuit misdetects because of including a subtracter for extracting a luminance signal by subtracting the output of the second BPF from the output of the first delay device.

DETAILED DESCRIPTION OF THE INVENTION

Figure 1:
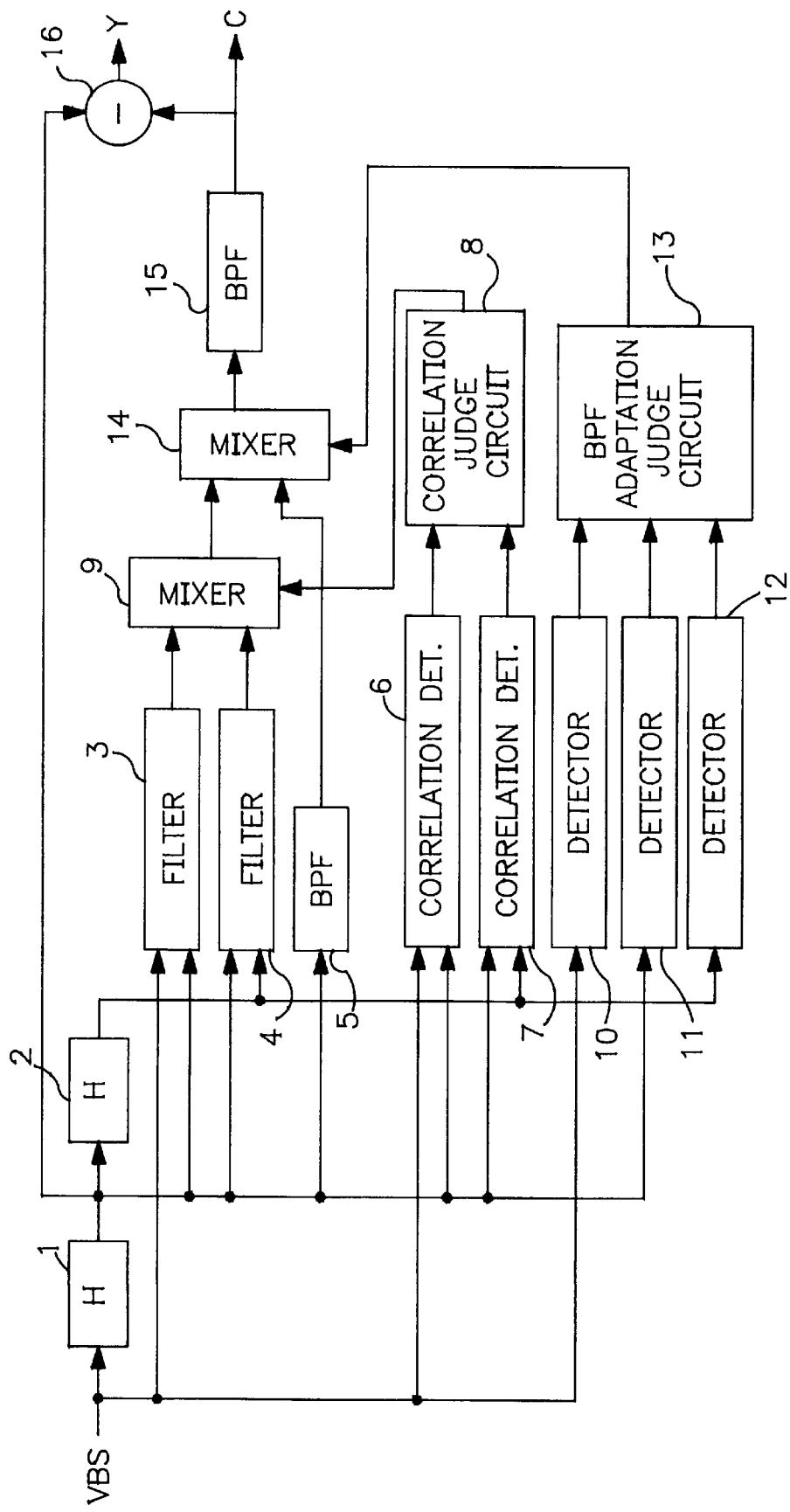
FIG. 1 is a block diagram of a Y/C separation apparatus in accordance with a first exemplary embodiment of the present invention.

Exemplary embodiments of the present invention are explained below, referring to the drawings.
(First exemplary embodiment).

A Y/C separation apparatus in accordance with a first exemplary embodiment is explained below, referring to FIG. 1.

Figure 2:
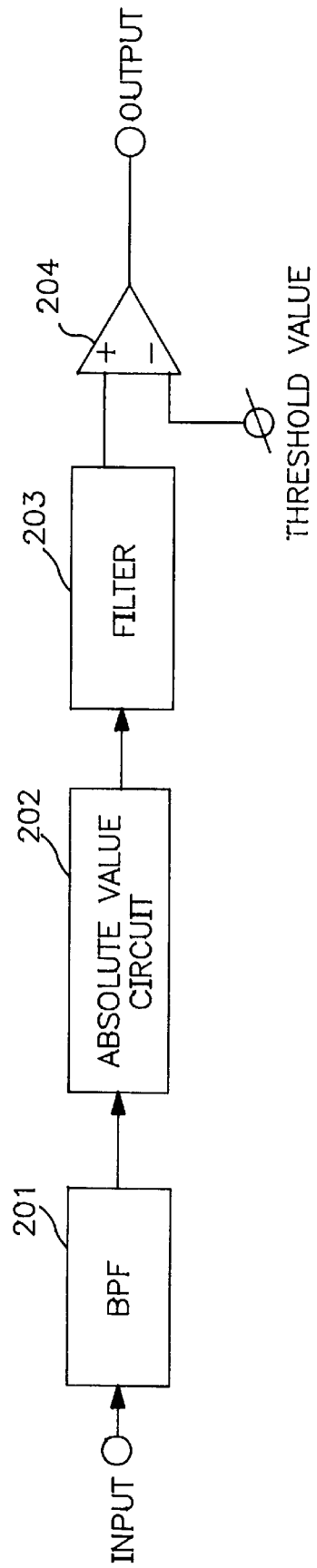
FIG. 2 is a block diagram of a high band level detection circuit of a Y/C separation apparatus in accordance with the first exemplary embodiment of the present invention.

FIG. 1 is a block diagram of a Y/C separation apparatus in accordance with a first exemplary embodiment of the present invention and FIG. 2 is a block diagram of a high band level detection circuit used in the Y/C separation apparatus.

In FIG. 1, the block 1 is a first delay device for delaying a composite color television input signal by 1H. The block 2 is a second delay device for delaying the output of delay device 1 by 1H. The block 3 is a first comb filter for extracting a chrominance signal from the input signal and the output of delay device 1. The block 4 is a second comb filter for extracting a chrominance signal from the outputs of delay devices 1 and 2. The block 5 is a first BPF for extracting a chrominance signal from the outputs of delay device 1. The block 6 is a first correlation detection circuit for obtaining a correlation between the input signal and the output of delay device 1. The block 7 is a second correlation detection circuit for obtaining a correlation between the outputs of delay devices 1 and 2. The block 8 is a correlation judging circuit for determining a mixing ratio of the outputs of the comb filters according to the outputs of correlation detection circuits 6 and 7. The block 9 is a first mixer for mixing the outputs of comb filters 3 and 4 according to the output of correlation judge circuit 8. The block 10 is a first high band level detection circuit for extracting a subcarrier frequency component from the input signal. The block 11 is a second high band level detection circuit for extracting a subcarrier frequency component from the output of first delay device 1. The block 12 is a third high band level detection circuit for extracting a subcarrier frequency component from the output of second delay device 2. The block 13 is a BPF adaptation judge circuit for obtaining a mixing ratio of the output of first mixer 9 to the output of first BPF 5 according to the outputs of high band level detection circuits 10, 11 and 12. The block 14 is a second mixer for mixing the output of first mixer 9 and the output of first BPF 5 according to the output of BPF adaptation judge circuit 13. The block 15 is a second BPF for limiting the bandwidth of the output of mixer 14. The block 16 is a subtracter for subtracting the output of second BPF 15 from the output of first delay device 1.

In FIG. 2 showing an example of a high band level detection circuit 10, 11 or 12, the block 201 is a third BPF for extracting a subcarrier frequency component from each input signal. The block 202 is an absolute value circuit for obtaining an absolute value of the output of BPF 201. The block 203 is a filter circuit for filtering the output of absolute value circuit 202. The block 204 is a comparator for comparing the output of filter circuit 203 with a designated threshold value.

The function of a Y/C separation apparatus composed like the above is explained below, referring to FIG. 1.

The inputted composite signal is delayed by each 1H at delay devices 1 and 2. The output of delay device 1 is a reference signal. Comb filters 3 and 4 are composed by making differences between the reference signal and the signals apart from the reference signal by 1H, ahead and behind. The comb filters separate chrominance signal components by subtracting the signals apart from the reference signal by 1H from the reference signal. A chrominance signal component is separated by making the reference signal pass through first BPF 5. Correlation detection circuits 6 and 7 detect correlations between the reference signal and the signals apart from the reference signal by 1H, ahead and behind. Correlation is detected, for example, by filtering the absolute value of the difference between chrominance signal components of two signals and comparing the filtered output with a designated value.

Correlation judge circuit 8 calculates a mixing ratio of the outputs of comb filters 3 and 4 according to the outputs of correlation detection circuits 6 and 7. Mixer 9 mixes the outputs of comb filters 3 and 4 corresponding to the calculated mixing ratio and outputs the mixed signal. Then, high band level detection circuits 10, 11 and 12 detect subcarrier frequency components from each signal on each line. If a subcarrier frequency component is not detected, it means that there is neither chrominance signal nor a high frequency component of a luminance signal.

High band level detection circuit detects if the high band (subcarrier frequency component) level is under a designated threshold value, for example over one period of the subcarrier signal. Although the optimum comb filter can be adapted by detecting a correlation between the reference signal and the signals apart from the reference signal by 1H, ahead and behind, it is sometimes insufficient. For example, in the case in which the reference signal is a black signal not having a chrominance signal component and the signals on the other lines forming comb filters have a chrominance signal, a chrominance signal component with a ½ level of a chrominance signal on the other line forming a comb filter is left in the signal passed the comb filter and passes subtracter 16 and dot interference appears on the luminance signal which is the reference signal.

In the case in which the reference signal is especially a black signal, dot interference is conspicuous comparing with the case in which the reference signal is not a black signal. What solves this problem is BPF adaptation judge circuit 13 and when the reference signal is in a black level, BPF adaptation judge circuit 13 judges to select the output of BPF 5. BPF adaptation judge circuit 13 filters the detected high band level, for example over one period of subcarrier and calculates a mixing ratio of the outputs of the BPFs. In this way, a smooth filter selection is possible. The output of first mixer 9 and the output of first BPF 5 are mixed at second mixer 14 according to the mixing ratio outputted from BPF adaptation judge circuit 13. When the reference signal is in a black level, BPF adaptation judge circuit 13 judges to select the output of first BPF 5.

Also when the reference signal includes a chrominance signal and a video signal on the scanning line forming the comb filter is in a black level and when a video signal is in a white level instead of a black level, BPF adaptation judge circuit 13 similarly judges to select the output of first BPF 5. A chrominance signal is outputted from second BPF 15 by limiting the bandwidth of the output of second mixer 14 at second BPF 15. A luminance signal is outputted from subtracter 15 by subtracting the chrominance signal outputted from second BPF 15 from a time compensated signal by delaying by 1H from the apparatus input signal.

(Second exemplary embodiment)

Figure 3:
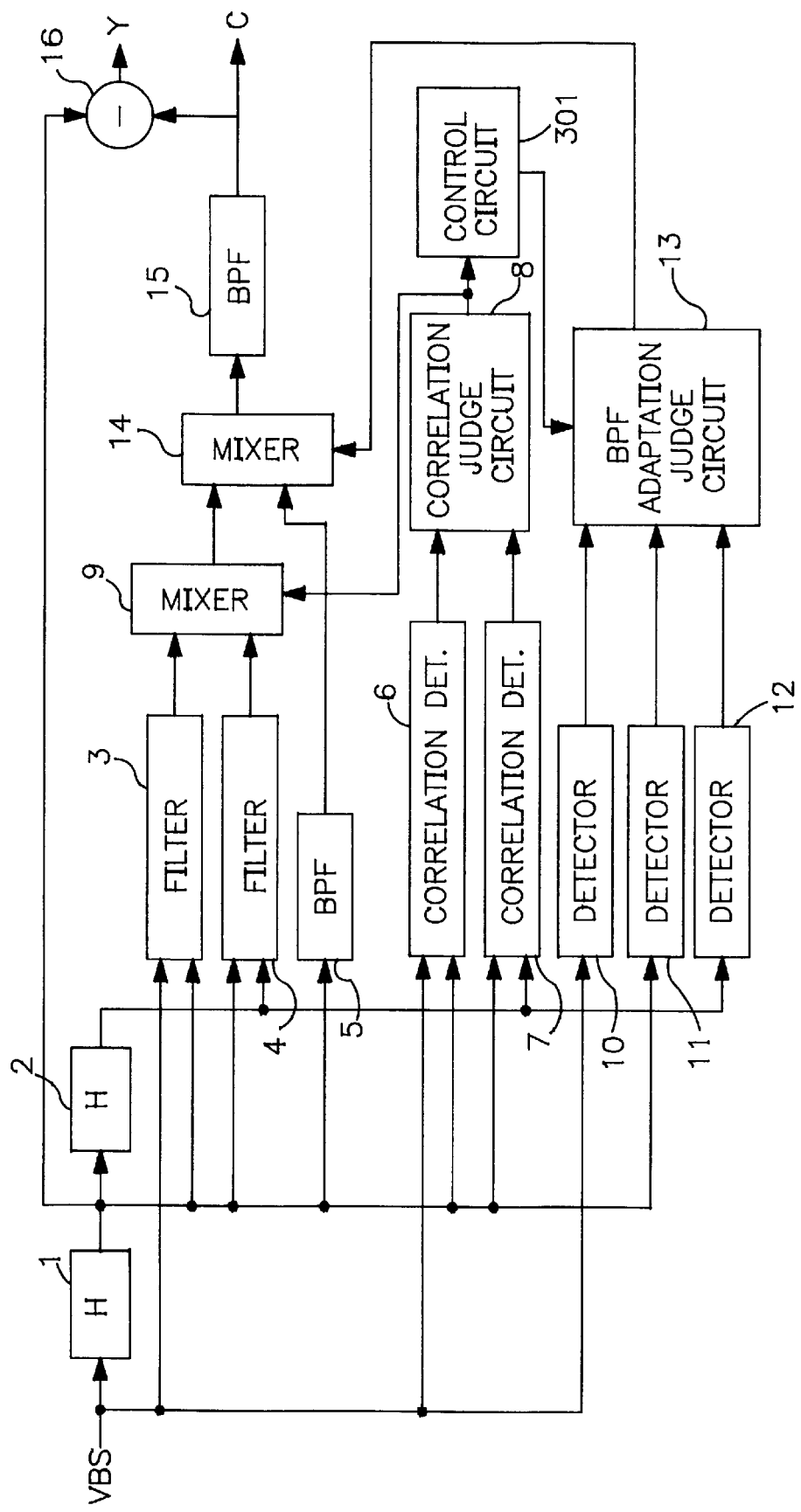
FIG. 3 is a block diagram of a Y/C separation apparatus in accordance with a second exemplary embodiment of the present invention.
Figure 4:
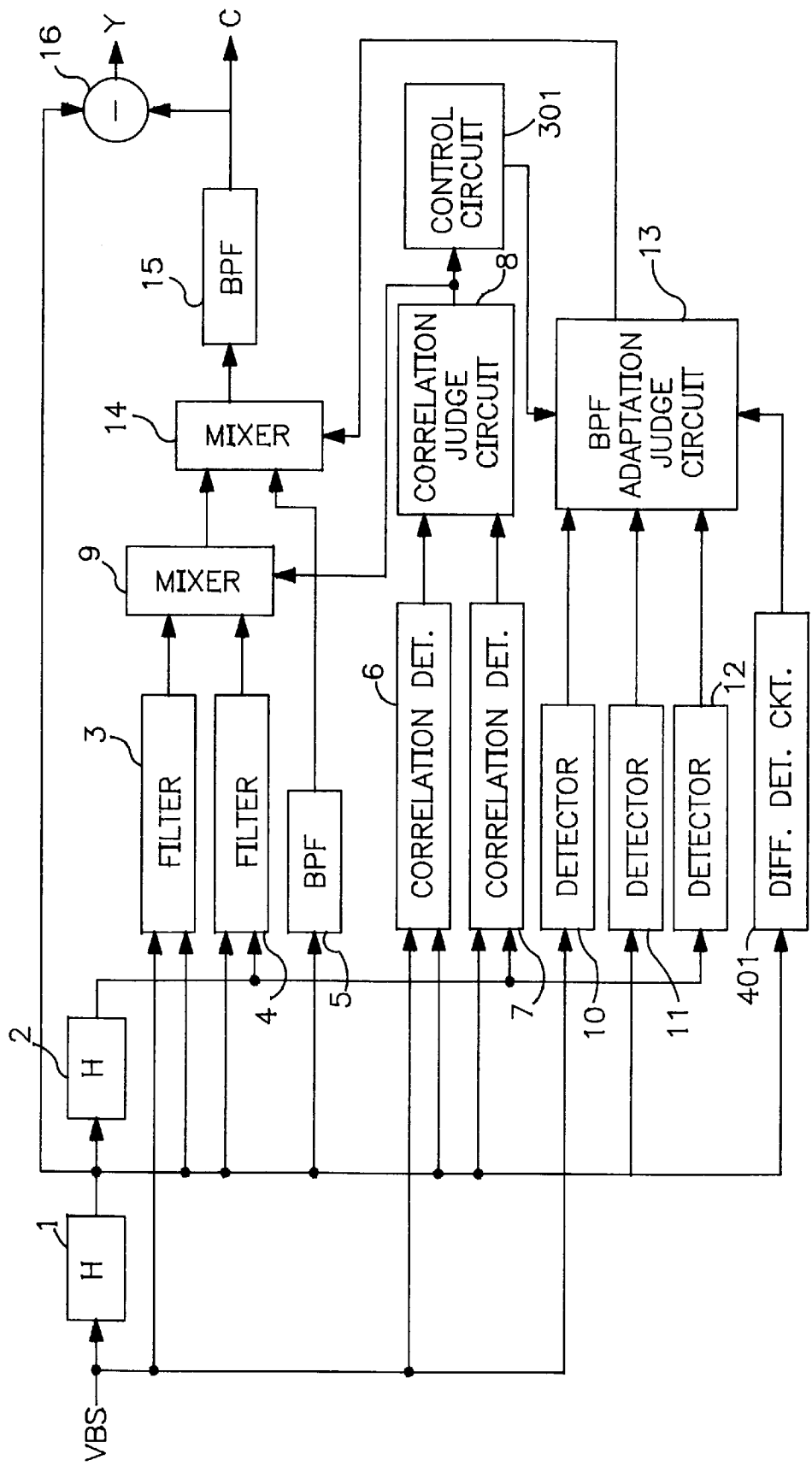
FIG. 4 is a block diagram of a Y/C separation apparatus in accordance with a third exemplary embodiment of the present invention.

FIG. 3 is a block diagram of a Y/C separation apparatus in accordance with a second exemplary embodiment of the present invention.

The configuration and the blocks of a Y/C separation apparatus in accordance with a second exemplary embodiment is the same as that of the first exemplary embodiment except that a control circuit is added. The explanation of the blocks except the control circuit and their functions are omitted.

The block 301 is a control circuit for controlling BPF adaptation judge circuit 13 forcibly not to adapt first BPF 5 when a vertical correlation exists.

Although a mixing ratio for first BPF 5 is calculated by detecting the high band detection level of the reference signal and the signals apart by 1H from the reference signal (vertically near points to the reference signal position) in the first exemplary embodiment, in the second exemplary embodiment, when vertical correlation is strong, it is controlled not to select first BPF 5. Thus, the output of first BPF 5 is not selected by mistake even for dark vertical lines and the like and a luminance resolution can be improved.

(Third exemplary embodiment)

Figure 5:
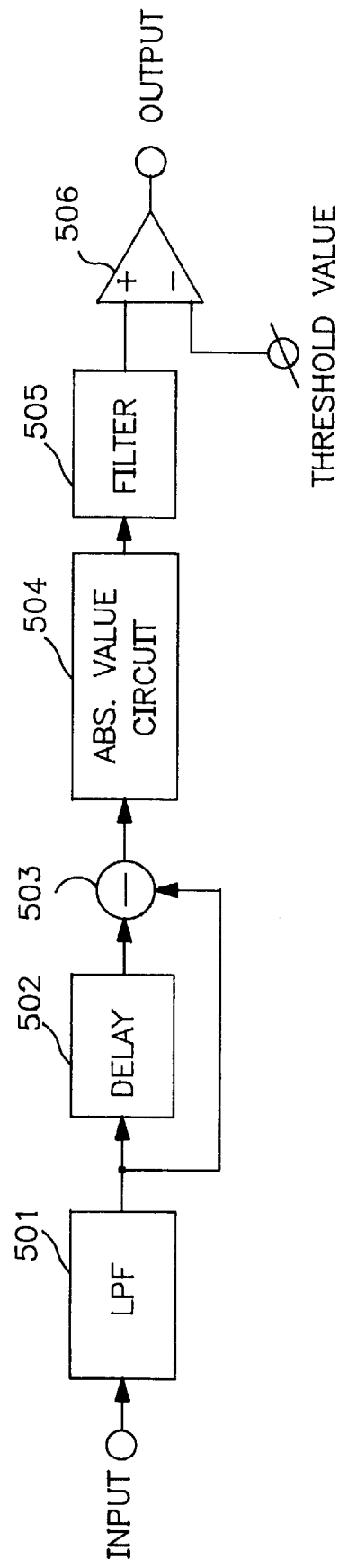
FIG. 5 is a block diagram of a low band level difference detection circuit of a Y/C separation apparatus in accordance with the third exemplary embodiment of the present invention.
Figure 6:
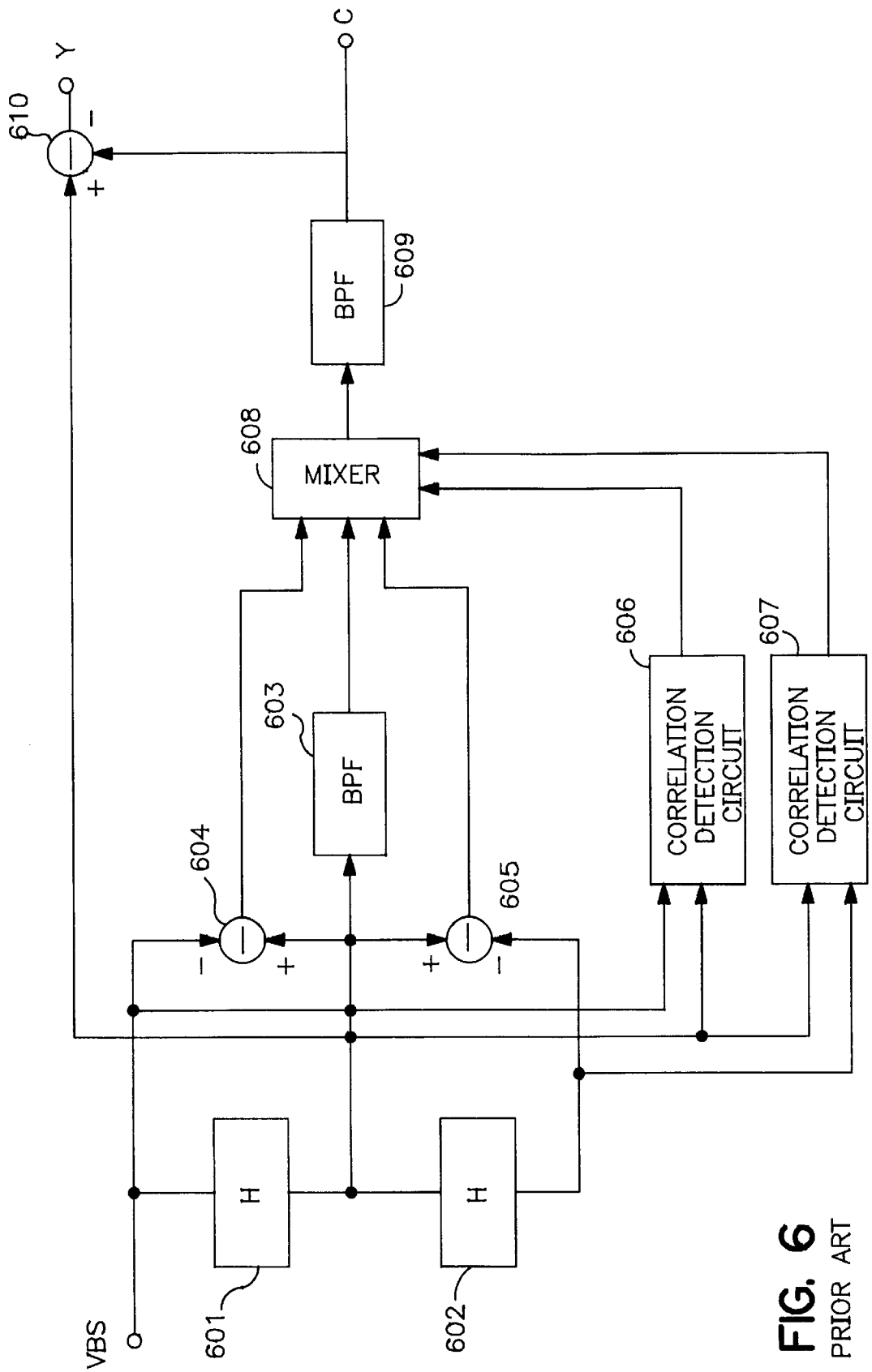
FIG. 6 is a block diagram of a Y/C separation apparatus in accordance with the prior art.

FIG. 5 is a block diagram of a Y/C separation apparatus in accordance with a fourth exemplary embodiment of the present invention and FIG. 5 is a block diagram of a low band level difference detection circuit used in the Y/C separation apparatus.

The configuration and the blocks of a Y/C separation apparatus in accordance with a third exemplary embodiment is the same as that of the second exemplary embodiment except a low band level difference detection circuit is added. The explanation of the blocks except the low band level difference detection circuit and their functions are omitted. The block 401 is a low band level difference detection circuit for detecting a low band level difference of the reference signal in a horizontal direction.

In FIG. 5, the block 501 is a low pass filter (LPF) for extracting a low band component of the input signal. The block 502 is a delay device for delaying the output of LPF 501 in horizontal direction. The block 503 is a subtracter for detecting a difference between the input and the output of delay device 502. The block 504 is an absolute value circuit for obtaining an absolute value of the output of subtracter 503. The block 505 is a filter circuit for filtering the output of absolute value circuit 504. The block 506 is a comparator for comparing the output of filter circuit 505 with a designated threshold. The output of filter circuit 505 is called horizontal correlation. In the third exemplary embodiment, a horizontal correlation of the low band component of the reference signal is detected and when there is no correlation, BPF adaptation judge circuit 13 is controlled so as to select the output of first mixer 9 without forcibly selecting the output of first BPF 5. Thus, resolution deterioration due to that first BPF 5 is selected for a signal of, for example an edge of a horizontal bright line can be prevented.

As described above, according to a Y/C separation apparatus of the present invention, in an adaptive type Y/C separation separating a-composite color television signal into a luminance signal and a chrominance signal, a Y/C separation which dot interference is not conspicuous even if correlation is detected by mistake is possible by detecting a high band level of the input signal and selecting a horizontal BPF when the high band level is low.

What is claimed is:

1. A Y/C separation apparatus for separating a composite color television signal into a luminance signal and a chrominance signal comprising:

delay means for delaying the composite color television signal and generating a delayed composite signal;

extracting means for extracting a chrominance signal from at least one of said composite color television signal and said delayed composite signal;

correlation means for detecting correlation between said composite color television signal and said delayed composite signal;

high band level detection means for detecting a high band level of said composite color television signal and said delayed composite signal;

judging means for controlling Y/C separation according to the high band level detected at said high band level detection means; and mixing means for mixing an output of said extracting means based on an output of said correlation means.

2. A Y/C separation apparatus for separating a composite color television signal into a luminance signal and a chrominance signal comprising:

delay means for delaying the composite color television signal and generating a delayed composite signal;

extracting means for extracting a chrominance signal from at least one of said composite color television signal and said delayed composite signal;

correlation means for detecting correlation between said composite color television signal and said delayed composite signal;

high band level detection means for detecting a high band level of said composite color television signal and said delayed composite signal;

judging means for controlling said composite color television signal and said delayed composite signal so as to pass only a directly filtered chrominance signal when said high band level is low; and mixing means for mixing an output of said extracting means based on an output of said correlation means.

3. A Y/C separation apparatus comprising:

first delay means for delaying an input signal, which is a composite color television signal, by one horizontal scanning period;

second delay means for delaying the output of said first delay means by one horizontal scanning period;

first comb filter means for extracting a chrominance signal from said input signal and the output of said first delay means;

second comb filter means for extracting a chrominance signal from the output of said first delay means and the output of said second delay means;

first band pass filter means for extracting a chrominance signal from the output of said first delay means;

first correlation detection means for calculating a correlation between said input signal and the output of said first delay means;

second correlation detection means for calculating a correlation between the output of said first delay means and the output of said second delay means;

correlation judge means for calculating a mixing ratio of the output of said first comb filter means to the output of said second comb filter means;

first mixing means for mixing the output of said first comb filter means and the output of said second comb filter means according to the output of said correlation judge means;

first high band level detection means for extracting and detecting a subcarrier frequency component from said input signal;

second high band level detection means for extracting and detecting a subcarrier frequency component from the output of said first delay means;

third high band level detection means for extracting and detecting a subcarrier frequency component from the output of said second delay means;

bandpass filter adaptation judge means for calculating a mixing ratio of the output of said first mixing means to the output of said first bandpass filter means:

second mixing means for mixing the output of said first mixing means and the output of said first bandpass filter means according to the output of said bandpass filter adaptation judge means;

second bandpass filter means for limiting the bandwidth of the output of said mixing means; and subtraction means for extracting a luminance signal by subtracting the output of said second bandpass filter means from the output of said first delay means.

4. A Y/C separation apparatus as recited in claim 3, further comprising:

control means for forcibly controlling said bandpass filter adaptation judge means not to select said first bandpass filter means when a vertical correlation exists, according to the output of said judge means.

5. A Y/C separation apparatus as recited in claim 4, further comprising:

low band level difference detection means for detecting a low band level difference in a horizontal direction of the input and output signals of a third delay means; and control means for controlling said bandpass filter adaptation judge means according to the output of said low band level difference detection means.

6. A Y/C separation apparatus as recited in claim 4, further comprising:

low band level difference detection means for detecting a low band level difference in a horizontal direction of the output of said third delay means; and control means for forcibly controlling said bandpass filter adaptation judge means not to select said first bandpass filter means according to said low band level difference detection means when said low band level difference is larger than a designated threshold value.

7. A method for separating a composite color television signal into a luminance signal and a chrominance signal comprising the steps of:

(a) generating a delayed composite signal from said composite color television signal;

(b) extracting a chrominance signal from at least one of said composite color television signal and said delayed composite signal;

(c) detecting correlation between said composite color television signal and said delayed composite signal;

(d) detecting a high band level of at least one of said composite color television signal and said delayed composite signal;

(e) controlling Y/C separation according to said high band level detected in step (d); and (f) mixing an output of said chrominance signal extracted in step (b) based on said correlation detected in step (c).

8. A Y/C separation apparatus according to claim 1, further comprising limiting means for limiting the bandwidth of an output of said mixing means.

* * * * *